(12) United States Patent
Kim et al.

(10) Patent No.: US 8,107,090 B2
(45) Date of Patent: Jan. 31, 2012

(54) IMAGE FORMING APPARATUS MANAGEMENT SERVER, SERVICE CONTINUITY SCORE (SCS) CALCULATING METHOD OF MANAGEMENT SERVER, AND IMAGE FORMING APPARATUS MANAGEMENT SYSTEM

(75) Inventors: Su-dong Kim, Suwon-si (KR); Chang-gi Kwon, Seoul (KR); Andrei Stepanov, Seoul (KR); Hyung-chan Kim, Yongin-si (KR); Jae-bum Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 890 days.

(21) Appl. No.: 12/139,703

(22) Filed: Jun. 16, 2008

(65) Prior Publication Data

US 2009/0002754 A1 Jan. 1, 2009

(30) Foreign Application Priority Data

Jun. 29, 2007 (KR) .................. 10-2007-0065800

(51) Int. Cl.
*G06F 15/173* (2006.01)
(52) U.S. Cl. ....... 358/1.1; 358/1.15; 358/1.14; 709/179; 709/183; 705/7.11; 705/7.28; 705/7.39; 399/8; 399/9; 399/10; 399/11; 399/18

(58) Field of Classification Search ............ 358/1.1, 358/1.14, 1.15; 705/7.28, 7.39, 7.11, 7.12–7.45; 702/179, 182, 186; 714/1, 2, 6.13, 6.31, 714/25, 51, 52, 48, 55
See application file for complete search history.

(56) References Cited

U.S. PATENT DOCUMENTS

| | | | | |
|---|---|---|---|---|
| 5,715,496 | A * | 2/1998 | Sawada et al. ................ | 399/8 |
| 5,815,280 | A * | 9/1998 | Ohmura et al. .............. | 358/296 |
| 6,915,059 | B2 * | 7/2005 | Daoud et al. ................. | 385/135 |
| 7,180,623 | B2 * | 2/2007 | Kato ............................ | 358/1.15 |
| 7,418,634 | B2 * | 8/2008 | Okuhara et al. .............. | 714/44 |
| 7,523,360 | B2 * | 4/2009 | Hashimoto et al. ........... | 714/57 |
| 7,694,115 | B1 * | 4/2010 | Porras et al. ................. | 713/1 |
| 2003/0077097 | A1 * | 4/2003 | Parry ............................ | 400/74 |
| 2009/0132294 | A1 * | 5/2009 | Haines ......................... | 705/4 |

* cited by examiner

*Primary Examiner* — Twyler Haskins
*Assistant Examiner* — Dennis Dicker
(74) *Attorney, Agent, or Firm* — Staas & Halsey LLP

(57) ABSTRACT

An image forming apparatus management server, a Service Continuity Score (SCS) calculating method of the management server, and an image forming apparatus management system. A setup manager sets a priority with respect to items required to calculate an SCS indicative of a normal operation time of an image forming apparatus, an incident manager registers and manages an incident related to the image forming apparatus, and an SCS manager calculates the SCS using the registered incident and the priority set for the items.

25 Claims, 14 Drawing Sheets

FIG. 3

| Device Priority | Device Priority Code($P_{PR}$) | Device Weight($PW[P_{PR}]$) |
|---|---|---|
| Low | 0 | 0.2 |
| Normal | 1 | 0.3 |
| High | 2 | 0.5 |

FIG. 4

| Incident Priority | Incident Priority Code | Description |
|---|---|---|
| Degradation | 0 | image forming apparatus is operational but its performance degrades |
| Interruption | 1 | image forming apparatus is not operational at all |

FIG. 5

| Time Priority | Time Priority Code($T_{PR}$) | Time Weight (TW[$P_{PR}$]) | Description |
|---|---|---|---|
| Non-Business | 0 | 0.05 | time period of no official working such as closing hour |
| Low Impact | 1 | 0.15 | time period of little working |
| Standard | 2 | 0.3 | time period of average working |
| Critical | 3 | 0.5 | time period of the most important working (compressed working time) |

FIG. 6

| Time Period | Time Priority | Time Priority Code($T_{PR}$) |
|---|---|---|
| 08:00 ~ 10:00 | Standard | 2 |
| 10:00 ~ 11:30 | Critical | 3 |
| 11:30 ~ 12:00 | Low Impact | 1 |
| 12:00 ~ 13:00 | Non-Business | 0 |
| 13:00 ~ 14:00 | Standard | 2 |
| 14:00 ~ 16:00 | Critical | 3 |
| 16:00 ~ 17:30 | Standard | 2 |
| 17:30 ~ 20:00 | Low Impact | 1 |
| 20:00 ~ 08:00 | Non-Business | 0 |

| Device Priority | Device Priority Code($P_{PR}$) | Device |
|---|---|---|
| Low | 0 | A |
| Normal | 1 | B,C |
| High | 2 | D,E,F |

FIG. 9

| NO | Device | Time | Status Information |
|---|---|---|---|
| 0 | A | 2006/05/02 18:02:00 | Device Not Operational-Incident Not Responded |
| | A | 2006/05/02 18:05:00 | Device Not Operational-Incident Not Resolved |
| | A | 2006/05/02 18:11:00 | Device Operational |
| 1 | C | 2006/05/08 11:12:00 | Device Not Operational-Incident Not Responded |
| | C | 2006/05/08 11:18:00 | Device Not Operational-Incident Not Resolved |
| | C | 2006/05/08 11:24:00 | Device Operational |
| 2 | F | 2006/05/15 16:10:00 | Device Not Operational-Incident Not Responded |
| | F | 2006/05/15 16:22:00 | Device Not Operational-Incident Not Resolved |
| | F | 2006/05/15 16:52:00 | Device Operational |
| 3 | B | 2006/05/16 10:05:00 | Device Not Operational-Incident Not Responded |
| | B | 2006/05/16 10:11:00 | Device Not Operational-Incident Not Resolved |
| | B | 2006/05/16 10:29:00 | Device Operational |
| 4 | C | 2006/05/20 18:03:00 | Device Not Operational-Incident Not Responded |
| | C | 2006/05/20 18:33:00 | Device Not Operational-Incident Not Resolved |
| | C | 2006/05/20 18:57:00 | Device Operational |
| 5 | F | 2006/05/28 14:29:00 | Device Not Operational-Incident Not Responded |
| | F | 2006/05/28 14:32:00 | Device Not Operational-Incident Not Resolved |
| | F | 2006/05/28 14:41:00 | Device Operational |
| 6 | F | 2006/05/30 09:00:00 | Device Not Operational-Incident Not Responded |
| | F | 2006/05/30 09:09:00 | Device Not Operational-Incident Not Resolved |
| | F | 2006/05/30 09:18:00 | Device Operational |

FIG. 10

| Status Information | Detail Description |
|---|---|
| Device Operational | the image forming apparatus is normally operational without any error, and no claim is received from the client |
| Device Not Operational | the image forming apparatus is not operational at all because of error |
| Device Not Operational-Incident Not Responded | error of the image forming apparatus is received, but there is no response of AS engineer for the resolution |
| Device Not Operational-Incident Not Resolved | after the claim was received and the AS engineer has responded or arrived, the incident is being resolved. The incident is not completely resolved. |
| Performance Degraded | the image forming apparatus is operational but its performance is degraded. (e.g. Toner Low) |
| Device Broken - Incident Resolved | while the image forming apparatus is not operational at all because of the serious error of the image forming apparatus, the error can be resolved and the image forming apparatus can be serviced, e.g. The printer was substituted by another printer |
| Device Broken - Incident Unresolved | the image forming apparatus is not operational at all because of the serious error of the image forming apparatus, and the solution is not found yet. |

FIG. 11

| NO | $IRspT$ | $IRslT$ | $OPT[P_{PR}, T_{PR}, j, i]$ |
|---|---|---|---|
| 0 | 0.05 (3 min) | 0.10 (6 min) | OPT[0,1,0,0] = 0.05 + 0.10 = 0.15 |
| 1 | 0.10 (6 min) | 0.10 (6 min) | OPT[1,3,1,0] = 0.10 + 0.10 = 0.20 |
| 2 | 0.20 (12 min) | 0.50 (30 min) | OPT[2,2,2,0] = 0.20 + 0.50 = 0.70 |
| 3 | 0.10 (6 min) | 0.30 (18 min) | OPT[1,3,0,0] = 0.10 + 0.30 = 0.40 |
| 4 | 0.50 (30 min) | 0.40 (24 min) | OPT[1,1,1,0] = 0.50 + 0.40 = 0.90 |
| 5 | 0.05 (3 min) | 0.15 (9 min) | OPT[2,3,2,0] = 0.05 + 0.15 = 0.20 |
| 6 | 0.15 (9 min) | 0.15 (9 min) | OPT[2,2,2,1] = 0.15 + 0.15 = 0.30 |

FIG. 12

| Device Priority | Time Priority | $SCS[P_{PR}, T_{PR}]$ | $T_\%[T_{PR}]$ | $SCS[P_{PR}]$ | $SCS_{TO}$ |
|---|---|---|---|---|---|
| High | Critical | SCS[2,3]=99.913 | 14.6% | 99.924 | 99.910 |
| High | Standard | SCS[2,2]=99.663 | 18.7% | 99.924 | 99.910 |
| High | Low Impact | SCS[2,1]=100 | 12.5% | 99.924 | 99.910 |
| High | Non-Business | SCS[2,0]=100 | 54.2% | 99.924 | 99.910 |
| Normal | Critical | SCS[1,3]=99.611 | 14.6% | 99.858 | 99.910 |
| Normal | Standard | SCS[1,2]=100 | 18.7% | 99.858 | 99.910 |
| Normal | Low Impact | SCS[1,1]=99.318 | 12.5% | 99.858 | 99.910 |
| Normal | Non-Business | SCS[1,0]=100 | 54.2% | 99.858 | 99.910 |
| Low | Critical | SCS[0,3]=100 | 14.6% | 99.972 | 99.910 |
| Low | Standard | SCS[0,2]=100 | 18.7% | 99.972 | 99.910 |
| Low | Low Impact | SCS[0,1]=99.773 | 12.5% | 99.972 | 99.910 |
| Low | Non-Business | SCS[0,0]=100 | 54.2% | 99.972 | 99.910 |

FIG. 13

| Time Priority | Device Priority | $SCS[P_{PR}, T_{PR}]$ | Weight (PW[$P_{PR}$]) | $SCS[T_{PR}]$ | Weight (TW[$P_{PR}$]) | $SCS_T$ |
|---|---|---|---|---|---|---|
| Critical | High | SCS[2,3]=99.913 | 0.5 | 99.840 | 0.5 | 99.832 |
| | Normal | SCS[1,3]=99.611 | 0.3 | | | |
| | Low | SCS[0,3]=100 | 0.2 | | | |
| Standard | High | SCS[2,2]=99.663 | 0.5 | 99.832 | 0.3 | |
| | Normal | SCS[1,2]=100 | 0.3 | | | |
| | Low | SCS[0,2]=100 | 0.2 | | | |
| Low Impact | High | SCS[2,1]=100 | 0.5 | 99.750 | 0.15 | |
| | Normal | SCS[1,1]=99.318 | 0.3 | | | |
| | Low | SCS[0,1]=99.773 | 0.2 | | | |
| Non-Business | High | SCS[2,0]=100 | 0.5 | 100 | 0.05 | |
| | Normal | SCS[1,0]=100 | 0.3 | | | |
| | Low | SCS[0,0]=100 | 0.2 | | | |

FIG. 14

|  |  | Device Priority ($P_{PR}$) | | | $I[T_{PR}]$ |
|---|---|---|---|---|---|
|  |  | Low | Normal | High |  |
| Time Priority ($T_{PR}$) | Non-Business | $I[P_{PR},T_{PR}]=I[0,0]$<br>$=RI[0,0]+UI[0,0]$<br>$=0$ | $I[1,0]$<br>$RI[1,0]+UI[1,0]$<br>$=0$ | $I[2,0]$<br>$RI[2,0]+UI[2,0]$<br>$=0$ | $I[0]$<br>$RI[0]+UI[0]$<br>$=0$ |
|  | Low Impact | $I[0,1]$<br>$RI[0,1]+UI[0,1]$<br>$=1$ | $I[1,1]$<br>$RI[1,1]+UI[1,1]$<br>$=1$ | $I[2,1]$<br>$RI[2,1]+UI[2,1]$<br>$=0$ | $I[1]$<br>$RI[1]+UI[1]$<br>$=2$ |
|  | Standard | $I[0,2]$<br>$RI[0,2]+UI[0,2]$<br>$=0$ | $I[1,2]$<br>$RI[1,2]+UI[1,2]$<br>$=0$ | $I[2,2]$<br>$RI[2,2]+UI[2,2]$<br>$=2$ | $I[2]$<br>$RI[2]+UI[2]$<br>$=2$ |
|  | Critical | $I[0,3]$<br>$RI[0,3]+UI[0,3]$<br>$=0$ | $I[1,3]$<br>$RI[1,3]+UI[1,3]$<br>$=2$ | $I[2,3]$<br>$RI[2,3]+UI[2,3]$<br>$=1$ | $I[3]$<br>$RI[3]+UI[3]$<br>$=3$ |
| $I[P_{PR}]$ |  | $I[0]$<br>$RI[0]+UI[0]$<br>$=1$ | $I[1]$<br>$RI[1]+UI[1]$<br>$=3$ | $I[2]$<br>$RI[2]+UI[2]$<br>$=3$ | $I_{total}=7$ |

FIG. 15

| Device Priority | Time Priority | Incident Thresholds | | Number of Incidents | Satisfaction | SCS($P_{PR}$, $T_{PR}$) Thresholds | | Actual SCS ($P_{PR}$, $T_{PR}$) | Satisfaction |
|---|---|---|---|---|---|---|---|---|---|
| | | MSL_I | ESL_I | | | MSL | ESL | | |
| High | Critical | 1 | 0 | I[2,3]=1 | satisfied | 99.925 | 99.950 | 99.913 | Penalty |
| High | Standard | 2 | 1 | I[2,2]=2 | satisfied | 99.900 | 99.925 | 99.663 | Penalty |
| High | Low Impact | 3 | 2 | I[2,1]=0 | Reward | 98.875 | 99.900 | 100 | Reward |
| High | Non-Business | 7 | 3 | I[2,0]=0 | Reward | 95.000 | 98.875 | 100 | Reward |
| Normal | Critical | 2 | 1 | I[1,3]=2 | satisfied | 99.900 | 99.925 | 99.611 | Penalty |
| Normal | Standard | 3 | 2 | I[1,2]=0 | Reward | 98.875 | 99.900 | 100 | Reward |
| Normal | Low Impact | 4 | 3 | I[1,1]=1 | Reward | 98.850 | 98.875 | 99.318 | Reward |
| Normal | Non-Business | 8 | 4 | I[1,0]=0 | Reward | 95.000 | 98.850 | 100 | Reward |
| Low | Critical | 3 | 2 | I[0,3]=0 | Reward | 98.875 | 99.900 | 100 | Reward |
| Low | Standard | 4 | 3 | I[0,2]=0 | Reward | 98.850 | 98.875 | 100 | Reward |
| Low | Low Impact | 5 | 4 | I[0,1]=1 | Reward | 98.825 | 98.850 | 99.773 | Reward |
| Low | Non-Business | 10 | 5 | I[0,0]=0 | Reward | 95.000 | 98.825 | 100 | Reward |

FIG. 16

| $SCS_P$ Thresholds | | Actual $SCS_P$ | Satisfaction | $SCS_T$ Thresholds | | Actual $SCS_T$ | Satisfaction |
|---|---|---|---|---|---|---|---|
| MSL | ESL | | | $MSL_T$ | $ESL_T$ | | |
| 99.900 | 99.950 | 99.914 | satisfied | 99.900 | 99.950 | 99.832 | Penalty |

IMAGE FORMING APPARATUS MANAGEMENT SERVER, SERVICE CONTINUITY SCORE (SCS) CALCULATING METHOD OF MANAGEMENT SERVER, AND IMAGE FORMING APPARATUS MANAGEMENT SYSTEM

CROSS-REFERENCE TO RELATED APPLICATION

This application claims priority from Korean Patent Application No. 2007-65800, filed in the Korean Intellectual Property Office on Jun. 29, 2007, the disclosure of which is incorporated herein by reference.

BACKGROUND OF THE INVENTION

1. Field of the Invention

Aspects of the present invention relate to an image forming apparatus management server, a service continuity score calculating method of the management server, and an image forming apparatus management system, and more particularly, to an image forming apparatus management server for providing objective analysis data for a service level of a printing account solution, a service continuity score calculating method of the management server, and an image forming apparatus management system.

2. Description of the Related Art

With advances of computer and electronic technologies, users are continuously demanding more enhanced and differentiated services. To meet the users' various demands, service providing systems make a great effort to generate more objective service level data. To provide these services, an enterprise printing account solution intends to receive and manage a problem occurring at the printer in use, to analyze the operational condition of the printer in use, and to inform the user of the service level of the solution.

However, a conventional enterprise printing account solution system can not present a printer condition analysis method or an objective method for measuring the service level of the printing account solution. As a result, the conventional system does not attain the user's reliability. Therefore, the conventional enterprise printing account solution system needs to provide a method for ensuring the reliability of the service by objectively analyzing the printing service condition, that is, providing analysis to the user according to the printing account solution level so that the user can learn of solution service quality in real time.

SUMMARY OF THE INVENTION

Aspects of the present invention provide an image forming apparatus management server to objectively analyze and provide a printing service condition, that is a service level of a printing account solution, a service continuity score calculating method of the management server, and an image forming apparatus management system.

An aspect of the present invention provides an image forming apparatus management server including a setup manager to set priority with respect to items required to calculate a Service Continuity Score (SCS) indicative of a normal operation time of an image forming apparatus, an incident manager to register and manage an incident related to the image forming apparatus, and an SCS manager to calculate the SCS using the registered incident and the priority set for the items.

According to another aspect of the present invention, the setup manager sets a device priority of image forming apparatuses, and a time priority of time periods.

According to another aspect of the present invention, the SCS manager includes a data collector to collect incidents occurring in a requested time period, a data classifier to determine the time priority set for the time period having the collected incidents and the device priority set for the image forming apparatus having the collected incidents, and to conduct mapping according to each of the collected incidents, and an SCS calculator to calculate the SCS according to a given criterion, using the time priority and the device priority that are mapped based on each of the collected incidents.

According to another aspect of the present invention, the SCS calculator calculates an SCS of the image forming apparatus, an SCS of a group comprising image forming apparatuses given the same device priority in a requested time period, an SCS of an image forming apparatus group given the same device priority, and an SCS of the image forming apparatuses.

According to another aspect of the present invention, the SCS manager further includes a report manger to generate a report of the calculated SCSs; wherein the SCS calculator calculates a number of the collected incidents according to a given criteria; and wherein the report manager determines a satisfaction of the SCS by comparing the calculated SCS with preset first thresholds and comparing the number of the calculated incidents with preset second thresholds, and generates the report of the determination results.

According to another aspect of the present invention, the SCS calculator calculates a number of incidents occurring at each of the image forming apparatuses, a number of incidents occurring at a group of image forming apparatuses given the same device priority during a requested time period, and a number of incidents occurring in a specific segment of a requested time period.

According to another aspect of the present invention, the setup manager applies a weight to the device priority set for each of the image forming apparatuses and applies a time weight to each of the time priorities; and the SCS manager calculates the SCS based on at least one of the weight applied to the device priority and the weight applied to the time priority.

According to another aspect of the present invention, the incident manager includes a claim handler to manage a claim received from a user of the image forming apparatus for a time period so that the received claim is registered and resolved, an inquiry handler to manage an inquiry related to the image forming apparatus and inquired by the user for a time period so that the inquiry is registered and resolved, and an error notification handler to manage a error notification automatically received from the image forming apparatus for a time period so that the error notification is registered and resolved.

According to another aspect of the present invention, the image forming apparatus management server further includes a first database (DB) which contains the priority set for the items at the setup manager, and a second DB which maps and stores the incidents registered by the incident manager with the time of the incidents and the image forming apparatuses having the incidents.

Another aspect of the present invention also provides a Service Continuity Score (SCS) calculating method of a management server, the method including: setting a priority with respect to items required to calculate an SCS indicative of a normal operation time of an image forming apparatus; registering and managing an incident related to the image forming apparatus; and calculating the SCS using the registered incident and the priority set for the items.

According to another aspect of the present invention, the setting of the priority comprises setting a device priority of image forming apparatuses and a time priority of time periods.

According to another aspect of the present invention, the calculating of the SCS includes collecting incidents occurring in a requested time period; determining the time priority set for the time period having the collected incidents, and the device priority set for the image forming apparatus having the collected incidents, and mapping according to each of the collected incidents; and calculating the SCS according to a given criteria, using the time priority and the device priority that are mapped based on each of the collected incidents.

According to another aspect of the present invention, the calculating of the SCS based on the specific criteria comprises calculating an SCS of the image forming apparatus, an SCS of a group comprising image forming apparatuses given the same device priority in a requested time period, an SCS of an image forming apparatus group given the same device priority, and an SCS of the entire image forming apparatus.

According to another aspect of the present invention, the SCS calculating method further includes calculating a number of the collected incidents according to the specific criteria, and generating a report of the calculated SCSs, wherein the generating of the report comprises determining a satisfaction of the SCS by comparing the calculated SCS with preset first thresholds and comparing the number of the incidents with preset second thresholds, and generating the report of the determination results.

According to another aspect of the present invention, the calculating of the number of incidents comprises calculating a number of incidents occurring at each of the individual image forming apparatuses, a number of incidents occurring at a group of image forming apparatuses given the same device priority during a requested time period, and a number of incidents occurring in a specific segment of a requested time period.

According to another aspect of the present invention, the setting of the priority comprises applying a weight to the device priority set for each of the image forming apparatuses and applying a time weight to each of the time priority; and the calculating of the SCS comprises calculating the SCS based on at least one of the weight applied to the device priority and the weight applied to the time priority.

According to another aspect of the present invention, the managing of the incident includes managing a claim received from a user of the image forming apparatus for a time period so that the received claim is registered and resolved; managing an inquiry related to the image forming apparatus and inquired by the user for a time period so that the inquiry is registered and resolved; and managing a error notification automatically received from the image forming apparatus for a time period so that the error notification is registered and resolved.

According to another aspect of the present invention, the managing of the incident further includes, when the error notification is registered, notifying an administrator responsible to process the error notification of the registered error notification using an e-mail address of a service provider or a short message service.

Another aspect of the present invention provides an image forming apparatus management system including a management server to calculate a Service Continuity Score (SCS) indicative of a normal operation time of image forming apparatuses and informs an administrator of the calculation result, and a service provider to receive an SCS calculation request from the administrator and to request the SCS calculation from the management server.

According to another aspect of the present invention, the management server includes a setup manager to set a device priority of each of the image forming apparatuses and a time priority of each of time periods required to calculate the SCS, an incident manager to register and manage incidents relating to the image forming apparatuses, and an SCS manager to calculate the SCS using the registered incidents and the set priorities.

According to another aspect of the present invention, the SCS manager includes a data collector to collect incidents occurring in a requested time period, a data classifier to determine the time priority set for the time period having the collected incidents and the device priority set for the image forming apparatus having the collected incidents, and to map according to each of the collected incidents, an SCS calculator which calculates the SCS according to a given criteria, using the time priority and the device priority that are mapped based on each of the collected incidents, and a report manager to generate a report of the calculated SCS.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a device priority table pre-classified to be set for the image forming apparatuses;

FIG. 4 is an incident table pre-classified to be set for the image forming apparatuses;

FIG. 5 is a time priority table pre-classified to be set for the image forming apparatuses;

FIG. 6 is a time priority table which classifies 24 hours (1 day) into four types based on FIG. 5;

FIG. 9 is a list of incidents occurred at the image forming apparatuses of FIG. 8 for 1 month;

FIG. 10 is a detailed table of the status information of FIG. 9;

FIG. 11 is a table showing the response time and the resolution time calculated for the incidents based on FIG. 9;

FIG. 12 is a table showing SCS[$P_{PR}$,$T_{PR}$], SCS[$P_{PR}$], and SCS;

FIG. 13 is a table showing the weighted $SCS_P$ and $SCS_T$;

FIG. 14 is a table showing the number of incidents based on the device priority and the time priority;

FIG. 15 is a table showing satisfactions of SCS[$P_{PR}$,$T_{PR}$] calculated based on Equation 12 and the number of the incidents I[$P_{PR}$,$T_{PR}$] of FIG. 14;

FIG. 16 is a table showing satisfaction of an SCS calculated based on the device weight and the time weight;

DETAILED DESCRIPTION OF THE EMBODIMENTS

Figure 1:
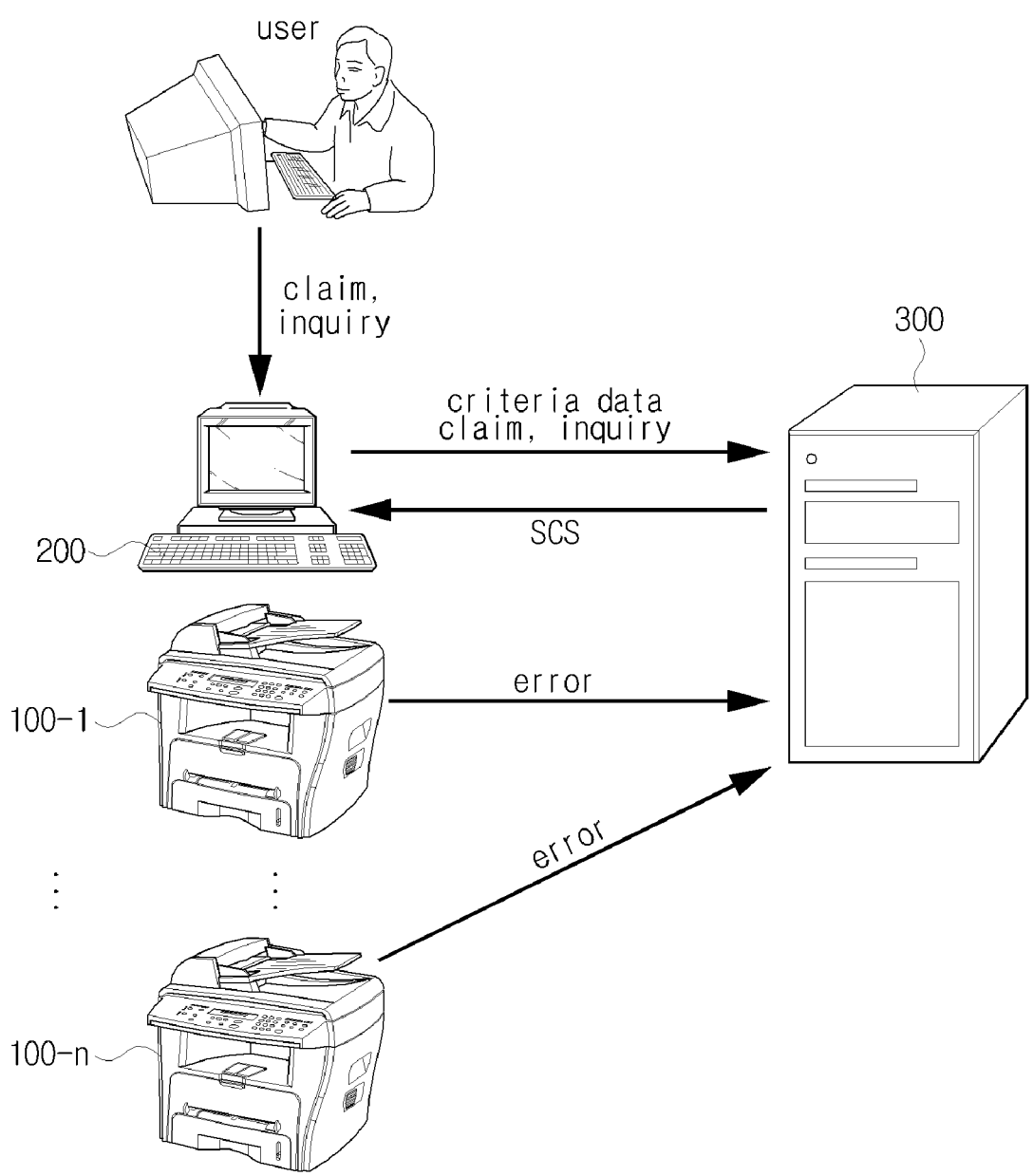
FIG. 1 is a diagram of an image forming apparatus management system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows an image forming apparatus management system according to an embodiment of the present invention. The management system of FIG. 1 comprises image forming apparatuses 100-1 through 100-n, a Service Provider (SP) 200, and an image forming apparatus management server (hereafter, referred to as a management server) 300. The image forming apparatuses 100-1 through 100-n, the SP 200, and the management server 300 can be connected over a wired or wireless communication network. Although the plurality of the image forming apparatuses 100-1 through 100-n are connected, only two image forming apparatuses are shown in FIG. 1 for convenience of description.

The image forming apparatuses 100-1 through 100-n are devices, such as printers, fax machines, copiers, scanners, and multifunctional devices, connected to a large-scale network such as an intranet. The image forming apparatuses 100-1 through 100-n may be products of the same manufacturer or of different manufacturers. The image forming apparatuses 100-1 through 100-n are managed by the SP 200.

The SP 200, which is a computer used by an administrator of the image forming apparatuses 100-1 through 100-n, can access to the management server 300 through a web browser such as Internet Explorer. The administrator has the authority to access the management server 300. The administrator defines a priority of items required to calculate a service continuity score (SCS) of the image forming apparatuses 100-1 through 100-n on web pages provided by an enterprise printing account solution of the management server 300. Criteria data comprising the item priority is transmitted to the management server 300 over a communication network (not shown). The administrator registers claims and inquiries received from users of the image forming apparatuses 100-1 through 100-n to the management server 300 through the SP 200.

The management server 300 provides an enterprise printing account solution and analyzes a service level of the solution. The enterprise printing account solution is a program developed by the providers of the image forming apparatuses 100-1 through 100-n to represent the good-quality service of the image forming apparatuses 100-1 through 100-n to the administrator or the users.

The enterprise printing account solution (hereafter, referred to as an account solution) analyzes the operation condition of the image forming apparatuses 100-1 through 100-n based on various criteria (such as priority of the image forming apparatuses 100-1 through 100-n and time period priority), calculates the SCS of the image forming apparatus, and provides the calculated SCS to the administrator of the image forming apparatuses 100-1 through 100-n. The SCS indicates a normal operation time of the image forming apparatuses 100-1 through 100-n. A greater SCS signifies normal operation (or more reliable operation) of the image forming apparatus.

The account solution provides the administrator with the analysis of the frequency of the incidents such as claims, inquiries, and errors of the image forming apparatuses 100-1 through 100-n, which is classified according to a given criterion, such as time period or image forming apparatus. Thus, the administrator, who requested to calculate the SCS, can confirm the service level and the performance of the image forming apparatuses 100-1 through 100-n in real time.

Figure 2:
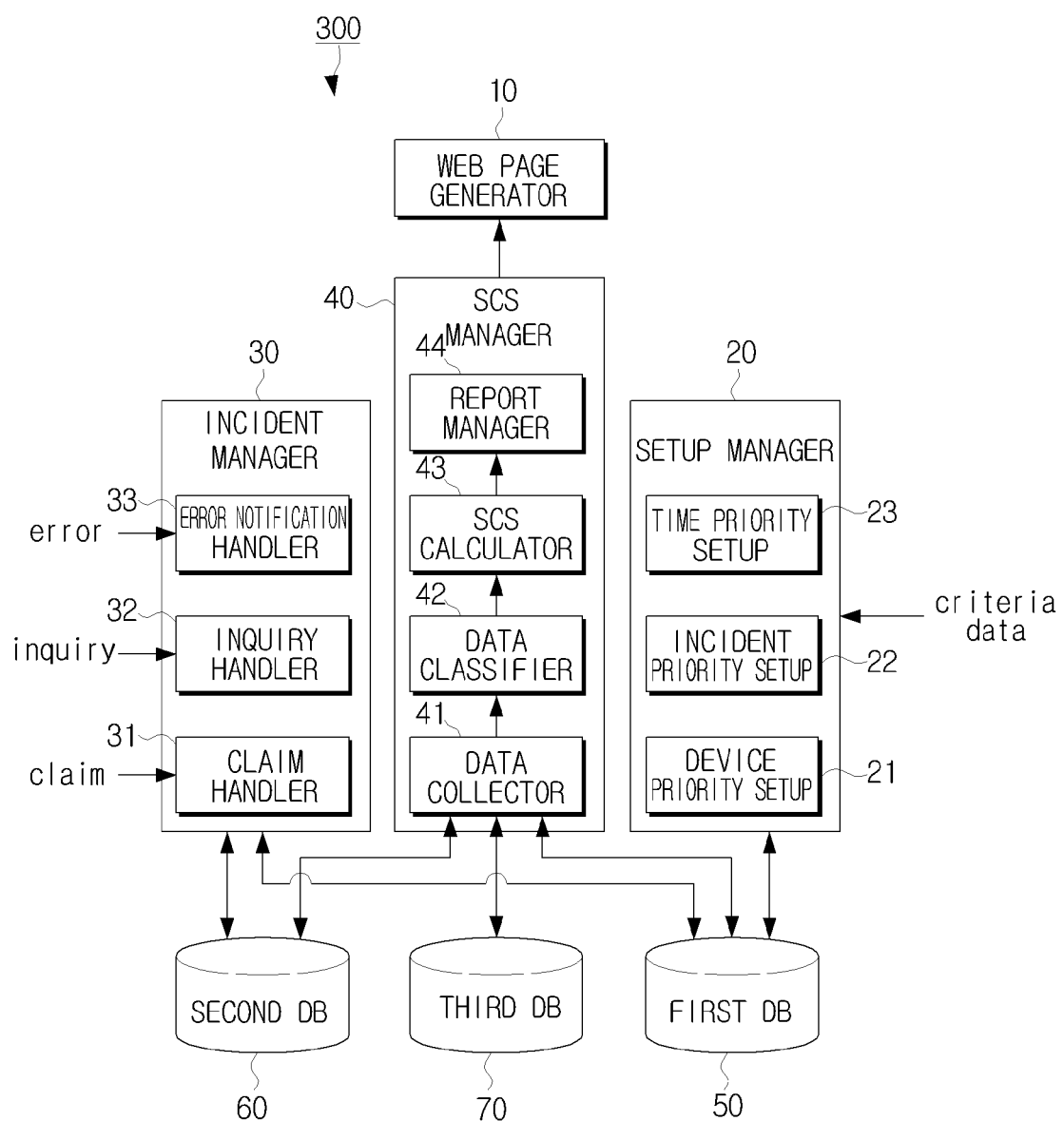
FIG. 2 is a detailed block diagram of the management server of FIG. 1.

FIG. 2 is a detailed block diagram of the management server 300 of FIG. 1. The management server 300 comprises a web page generator 10, a setup manager 20, an incident manager 30, an SCS manager 40, a first database (DB) 50, a second DB 60, and a third DB 70. According to other aspects of the present invention, the management server 300 may include additional and/or different units. Similarly, the functionality of two or more of the above units may be integrated into a single component.

When the administrator accesses the management server 300 through the web browser of the SP 200, the web page generator 10 generates web pages related to the account solution. A communication interface (not shown) sends the web pages to the SP 200. The administrator sets or adjusts the priority and the weight of the basic items, that is, the criteria data related to the image forming apparatuses 100-1 through 100-n, using the web pages received from the management server 300, and registers the incidents received from the users. The basic factors used to calculate the SCS comprise model, installation position, incident status, and incident occurrence time of the image forming apparatuses 100-1 through 100-n. Other factors may also be taken into account when calculating the SCS.

The administrator gives the device priority to the image forming apparatuses 100-1 through 100-n on the web pages by determining the device priority based on the installed post of the company and the installed position or the model of the image forming apparatuses 100-1 through 100-n. For this purpose, information of the image forming apparatuses 100-1 through 100-n may be registered to the management server 300 in advance, or the administrator may give the priority while adding the image forming apparatuses 100-1 through 100-n on the web pages.

The device priority may be one of several priorities predefined in the solution of the management server 300, as shown in FIG. 3. The administrator selects the device priority to be given to the image forming apparatuses 100-1 through 100-n based on the information of FIG. 3. The image forming apparatuses 100-1 through 100-n of the same device priority constitute one group.

In FIG. 3, the device priority is divided into 'High', 'Normal', and 'Low'. Each device priority (i.e., each group), is given a code $P_{PR}$. A device weight $PW[P_{PR}]$, given based on the device priority, can be changed by the administrator. Since the priority of the image forming apparatuses 100-1 through 100-n differs depending on their post or user, the management server 300 sets the device priority to calculate the SCS by taking into account the priority.

The administrator gives an incident priority in advance based on information of FIG. 4 according to the incidents and the image forming apparatuses 100-1 through 100-n on the web pages. For example, 100 incidents can be related to the image forming apparatuses 100-1 through 100-n. The administrator gives the incident priority based on the 100 incidents. The incident priority given by the administrator can be one of priorities pre-defined in the solution of the management server 300, and can be extended.

The incident priority of FIG. 4 largely comprises 'Degradation' and 'Interruption'. A code is assigned to each incident priority. For instance, for the degradation of the printing quality, the administrator can give the incident priority of 'Degradation'.

The administrator gives different time priority according to the time period of the image forming apparatuses 100-1 through 100-*n*, for example, according to the office hours of the enterprise on the web pages. The time period priority may be pre-defined in the solution as shown in FIG. 5. The administrator can give the time priority based on the table of FIG. 5. The time priority of FIG. 5 comprises 'Non-Business', 'Low Impact', 'Standard', and 'Critical'. Code $T_{PR}$ and time weight $TW[P_{PR}]$ are given to each priority. The time weight $TW[P_{PR}]$ can be changed by the administrator. 24 hours of 1 day can be divided to 4-type time priorities as shown in FIG. 6. Since the error, the number of incidents and the type of the incidents occurring at the image forming apparatuses 100-1 through 100-*n*, vary according to the business hour, the management server 300 sets the time priority to calculate the SCS based on this fact.

The administrator registers claims and inquiries received from the users of the image forming apparatuses 100-1 through 100-*n* to the management server 300 via the SP 200. The criteria data set or modified on the web pages is input to the setup manager 20, and the received incidents are input to the incident manager 30.

The setup manager 20 sets the priority of the items required to calculate the SCS. The setup manager 20 sets the device priority, the incident priority, and the time priority that are the basic information for calculating the SCS. For this purpose, the setup manager 20 comprises a device priority setup unit 21, an incident priority setup unit 22, and a time priority setup unit 23.

The device priority setup unit 21 sets the device priority and the device weight $PW[P_{PR}]$ input by the administrator on the web pages using the data of FIG. 3 according to the image forming apparatuses 100-1 through 100-*n*. The incident priority setup unit 22 sets the incident priority input by the administrator on the web pages using the data of FIG. 4. The time priority setup unit 23 sets the time period based the time priority and the time weight $TW[P_{PR}]$ input by the administrator on the web pages using the data of FIG. 5.

Referring back to FIG. 2, the incident manager 30 registers the incidents relating to the image forming apparatuses 100-1 through 100-*n*, and manages a time taken from the receipt to the resolution completion of the registered incident. The incident relating to the image forming apparatuses 100-1 through 100-*n* varies, and may include lack of toner, degradation of printing quality, or power malfunction. The incidents can be classified largely into three types comprising a claim, an inquiry suggested by the user, and an error notification received directly from the image forming apparatuses 100-1 through 100-*n*. The incident manager 30 comprises a claim handler 31, an inquiry handler 32, and an error notification handler 33.

When a claim of the image forming apparatuses 100-1 through 100-*n* is received from the user, the administrator inputs the received claim together with the occurrence time of the claim and the claimed image forming apparatus on the web pages of the solution. The claim hander 31 gives at least one of the incident priorities of FIG. 3 to the input claim. The administrator may give the incident priority in person. The claim handler 31 acquires, registers, and stores the occurred claim, the occurrence time of the claim, and the information of the corresponding image forming apparatus to the second DB 60. The claim handler 31 manages the status change and the time until the claim is resolved.

When an inquiry relating to the image forming apparatuses 100-1 through 100-*n* is received from the user, the administrator inputs the received inquiry with the receipt time of the inquiry and information of the corresponding image forming apparatus on the web pages. The inquiry handler 32 gives the incident priority of FIG. 3 to the input inquiry. The inquiry handler 32 acquires, registers, and stores the occurred inquiry, the occurrence time of the inquiry, and the information of the corresponding image forming apparatus to the second DB 60. The inquiry handler 32 manages the status change and the time until the inquiry is resolved. For this purpose, the administrator needs to provide the status change and the time of the claim and the inquiry to the inquiry handler 32. It is possible to modify or delete the registered claim and inquiry.

The image forming apparatuses 100-1 through 100-*n* may also recognize their errors by themselves and transmit an error notification to the error notification handler 33 over the communication network (not shown). The error notification handler 33 receives the error notification automatically transmitted from the image forming apparatuses 100-1 through 100-*n*, gives the incident priority to the errors based on FIG. 3, registers them to the second DB 60, and manages the status change and the time until the registered error notification is completely resolved.

The error notification handler 33 notifies the administrator responsible for the error management of the error. For example, the error notification handler 33 may send an e-mail to the administrator by retrieving an e-mail address stored in the second DB 60, or send a short message to the administrator automatically using a short message service. It is preferred that the management server 300 has an e-mail delivery function and a short message service function. Such functions are well-known in the art and shall not be described in detail.

The claim handler 31, the inquiry handler 32, and the error notification handler 33 generate an occurrence event signifying the incident generation, response/arrival events signifying that a repairman of the incident has responded to or arrived at the user, and a completion event signifying the incident resolution, and store the generated events to the second DB 60. The event is generated based on the occurrence time, the response/arrival time, and the resolution time input by the administrator.

The SCS manager 40 calculates the SCS using the incident registered to the incident manager 30 and the priorities set by the setup manager 20, and generates a report to show the calculated SCS. The SCS manager 40 comprises a data collector 41, a data classifier 42, an SCS calculator 43, and a report manager 44. The administrator can request to calculate the SCS based on various criteria, such as specific time period, specific time, and specific image forming apparatus. When the calculation of the SCS is requested, the data collector 41 collects the criteria data of FIGS. 1 through 3 from the first DB 50 and the incidents occurring in a requested time period from the second DB 60.

The data classifier 42 confirms from the second DB 60 the occurrence times and the resolution times of the collected incidents, and the image forming apparatuses having the collected incidents, confirms the time priority set in the confirmed time and the device priority set for the confirmed image forming apparatuses 100-1 through 100-*n* from the second DB 60, and maps and classifies the confirmed times, the confirmed time priorities, and the confirmed device priorities based on the collected incidents.

The SCS calculator 43 calculates the SCS using the information classified by the data classifier 42. When even one incident does not occur during a requested time period, the SCS is 100%. The SCS represents the normal operation time of the image forming apparatus over a certain time period as the percentage. The greater the SCS, the better the performance of the image forming apparatus. The SCS is thus linked directly to customer satisfaction.

The SCS calculator 43 can calculate various SCSs according to specific criteria. For example, the SCS calculator 43 calculates the SCS of each image forming apparatus (Equation 11), the SCS of the same group in a requested time period (Equation 12), the SCS of the group (Equation 13), and the SCS of the entire image forming apparatus 100-1 through 100-$n$ (Equation 14). The same group is a group comprising the image forming apparatuses of the same device priority (e.g., B and C in FIG. 8).

When the weights $PW[P_{PR}]$ and $TW[P_{PR}]$ are assigned based on the priorities as shown in FIGS. 3 through 5, the SCS calculator 43 may calculate the SCSs $SCS_P$ and $SCS_T$ based on at least one of the assigned weights $PW[P_{PR}]$ and $TW[P_{PR}]$.

The SCS calculator 43 may calculate the number of incidents by specific criteria. For example, the SCS calculator 43 may calculate the number of incidents according to the individual image forming apparatus 100-1 through 100-$n$, the number of incidents in the same group over a specific time period, the number of incidents in the same group during a requested time period, or a total number of incidents in a specific time period of a requested time period.

The report manager 44 generates a report of the calculated SCSs and the number of the collected incidents. The report manager 44 determines the satisfaction of the SCSs SCS, $SCS_P$, and $SCS_T$ by comparing preset first thresholds with the calculated SCSs and comparing preset second thresholds with the calculated number of the incidents, and generates the report of the results. The satisfaction may comprise 'Penalty', 'Satisfied', and 'Reward'. The report manager 44 will be explained in more detail below.

The first DB 50 contains the information required for setting the criteria data as shown in FIGS. 3 through 5. The first DB 50 contains the device priority, the device weight $PW[P_{PR}]$, the code $P_{PR}$ of the device priority, the time priority based on the time period, the time weight $TW[P_{PR}]$, the code of the time priority, and the incident grade of the image forming apparatuses 100-1 through 100-$n$ set by the administrator.

The second DB 60 contains the claim and the inquiry received from the user and input by the administrator, the error automatically received from the image forming apparatuses 100-1 through 100-$n$, the time of the error occurrence, the response time of the repairman, and the error resolution time. When the administrator inputs a time, the incident manager 30 generates the corresponding event. The generated event is stored to the second DB 60, which is used to calculate the OPT. The second DB 60 also contains an e-mail address or a mobile phone number of the officer who is in charge of the incident handling. The incident manager 30 may inform the officer of the incident receipt using the e-mail address or the mobile phone number.

The third DB 70 contains the rule required to calculate the SCSs at the SCS manager 40, the account solution, and the data collected by the data collector 41. The third DB 70 may also store the thresholds required to determine the satisfaction (such as 'Penalty' and 'Reward') at the report manager 44, and the reports generated at the report manager 44.

A way in which the SCS calculator 43 of FIG. 2 calculates the SCS will now be described in further detail. To calculate the SCS, the SCS calculator 43 numerically expresses the attributes relating to the device priority and the time priority as shown in Table 1 and Table 2.

TABLE 1

| Attribute of device priority | Description |
|---|---|
| $P_{PR}$ | Code of device group in device priority table e.g., $P_{PR}$ = 0, 1, 2 in FIG. 3 |
| $N[P_{PR}]$ | Number of devices in device priority group |
| $N_{P_{PR}}$ | Number of device priority groups, that is, number of codes e.g., $N_{P_{PR}}$ = 3 in FIG. 3 |

In Table 1, $P_{PR}$ indicates the code given to the device priority as shown in FIG. 3. The device group is the group comprising the image forming apparatuses of the same device priority. The individual code can be one device group. For example, when three image forming apparatuses are given the device priority 'High', two image forming apparatuses are given the device priority 'Normal', and one image forming apparatus is given the device priority 'Low' according to the analysis of the data gathered at the data collector 41, $N[P_{PR}]$= N[0]=1, N[1]=2, N[2]=3, and $N_{P_{PR}}$=3.

TABLE 2

| Attribute of time priority | Description |
|---|---|
| $T_{PR}$ | Code of time period in time period table e.g., $T_{PR}$ = 0, 1, 2, 3 in FIG. 5 |
| $T[T_{PR}]$ | Hours of time period in time period priority group per month, 1 month = 22 days) |
| $N_{T_{PR}}$ | Number of time period priority groups, that is, number of codes e.g., $N_{T_{PR}}$ = 4 in FIG. 5 |

In Table 2, $T_{PR}$ indicates the code given to the time priority as shown in FIG. 5. The time group is the group comprising the time periods of the same time priority. The individual code can be one time group.

FIG. 6 is a table that classifies 24 hours of 1 day into four time periods based on FIG. 5. The administrator can set and change the time priority based on the time period by referring to FIG. 5, using the function provided by the time priority setup 23. In FIG. 6, on a 1-day basis, T[0]=13 hours, T[1]=3 hours, T[2]=4.5 hours, and T[3]=3.5 hours.

The SCS calculator 43 calculates the percentage of the times allocated to the individual $T[T_{PR}]$ based on FIG. 6. For example, provided that 22 days in 1 month are the average number of office days per month, T[0]=13 hours×22 days=286 hours, T[1]=3 hours×22 days=66 hours, T[2]=4.5 hours×22 days=99 hours, and T[3]=3.5 hours×22 days=77 hours.

Based on $$T_\%[T_{PR}] = \frac{T[T_{PR}]}{24 \text{ hours} \times 22 \text{ days}} \times 100,$$

the percentage of $T[T_{PR}]$ can be acquired as below:

$$T_{\%}[0] = \frac{286}{24 \times 22} \times 100 = 54.2\%$$

$$T_{\%}[1] = \frac{66}{24 \times 22} \times 100 = 12.5\%$$

$$T_{\%}[2] = \frac{99}{24 \times 22} \times 100 = 18.7\%$$

$$T_{\%}[3] = \frac{77}{24 \times 22} \times 100 = 14.6\%.$$

Next, the SCS calculator 43 measures the incident occurrence time, the response time, and the resolution time by confirming the occurrence event, the response/arrival event, and the resolution event.

Figures 7, 8:
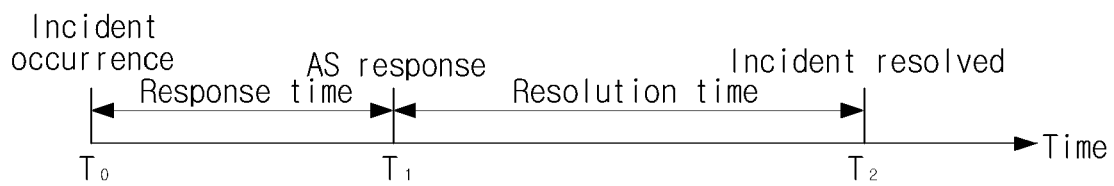
FIG. 7 is a diagram of an incident time, a response time, and a resolution time.
FIG. 8 is a device priority table set at image forming apparatuses.

FIG. 7 depicts the incident occurrence time, the response time, and the resolution time. As shown in FIG. 7, $T_0$ indicates the incident occurrence time, $T_1$ is the response time or the arrival time of the repairman, and $T_2$ indicates the incident resolution time. The response time (IRspT), the resolution time (IRslT), and the Outage Processing Time (OPT) of the service discontinuity of the image forming apparatuses 100-1 through 100-*n* are measured as below:

$$\text{IRspT} = T_1 - T_0$$

$$\text{IRslT} = T_2 - T_1$$

$$\text{OPT} = \text{IRspT} + \text{IRslT}.$$

The incident processing time is defined in more detail using the above process.

Within a requested time period, when the incident processing time of the incident i occurring at the image forming apparatus j belonging to the group having the device priority code $P_{PR}$ in the time period of the code $T_{PR}$ given based on the time priority is defined as $\text{OPT}[P_{PR}, T_{PR}, j, i]$, $\text{OPT}[P_{PR}, T_{PR}, j, i]$ can be expressed as Equation 1.

$$\text{OPT}[P_{PR}, T_{PR}, j, i] = \text{IRspT}[P_{PR}, T_{PR}, j, i] + \text{IRslT}[P_{PR}, T_{PR}, j, i] \quad \text{[Equation 1]}$$

where $P_{PR} = 0, 1, \ldots, N_{P_{PR}} - 1$, $T_{PR} = 0, 1, \ldots, N_{T_{PR}} - 1$, $j = 0, \ldots, N[P_{PR}] - 1$, $i = 0, \ldots, I[P_{PR}, T_{PR}, j] - 1$ In Equation (1), $j = 0, \ldots, N[P_{PR}] - 1$ is the number identifying the image forming apparatuses of the same device code, and $I[P_{PR}, T_{PR}, j]$ indicates the number of incidents occurring at the image forming apparatus j belonging to the group having the device priority code $P_{PR}$ in the time period with the code $T_{PR}$ given based on the time priority within a requested time period. This definition considers the case where one or more incidents occur at the image forming apparatus j during the time period of the code $T_{PR}$.

When Equation 1 is defined, the SCS calculator 43 calculates the average number of incidents occurring per one image forming apparatus. For this purpose, the SCS calculator 43 calculates the number of incidents $I_{total}$ at all of the image forming apparatuses 100-1 through 100-*n* during a requested time period based on Equation 2, and expresses the number of printers according to Equation 3.

$$I_{total} = \sum_{P_{PR}=0}^{N_{P_{PR}}-1} \sum_{j=0}^{N[P_{PR}]-1} \sum_{T_{PR}=0}^{N_{T_{PR}}-1} I[P_{PR}, T_{PR}, j] \quad \text{[Equation 2]}$$

Equation 2 expresses the total number of the incidents at every image forming apparatus (e.g., the image forming apparatus of $P_{PR} = 1$) in the device group of the image forming apparatus j.

$$N_{printers} = \sum_{P_{PR}=0}^{N_{P_{PR}}-1} N[P_{PR}] \quad \text{[Equation 3]}$$

In Equation 3, $N_{printers}$ is the number of the image forming apparatuses 100-1 through 100-*n*. Referring to FIG. 8, $N_{printers} = N[0] + N[1] + N[2] = 1 + 2 + 3 = 6$. Thus, the average number of incidents per one image forming apparatus can be expressed according to Equation 4.

$$I_{average} = \frac{I_{total}}{N_{printers}} = \frac{A}{\sum_{P_{PR}=0}^{N_{P_{PR}}-1} N[P_{PR}]} \quad \text{[Equation 4]}$$

where $A = \sum_{P_{PR}=0}^{N_{P_{PR}}} \sum_{j=0}^{N[P_{PR}]-1} \sum_{T_{PR}=0}^{N_{T_{PR}}-1} I[P_{PR}, T_{PR}, j]$ When the average number of the incidents per one image forming apparatus is acquired based on Equation 4, the SCS calculator 43 calculates the entire incident processing time at the image forming apparatus j belonging to the group of the device priority code $P_{PR}$ during the time period of the code $T_{PR}$ given based on the time priority, based on Equation 5.

$$\text{OPT}[P_{PR}, T_{PR}, j] = \sum_{i=0}^{I[P_{PR}, T_{PR}, j]-1} \text{OPT}[P_{PR}, T_{PR}, j, i] \quad \text{[Equation 5]}$$

In Equation 5, $\text{OPT}[P_{PR}, T_{PR}, j]$ indicates the processing time of all incidents occurring at the image forming apparatus j. $\text{OPT}[P_{PR}, T_{PR}, j, i]$ in Equation 1 indicates the time taken to process one incident i. Accordingly, the total processing time of the incidents at the image forming apparatuses 100-1 through 100-*n*, $\text{OPT}_{total}$ is calculated based on Equation 6.

As shown in FIGS. 9 and 10, during one month, one incident is generated at the image forming apparatuses A and B, two incidents are generated at the image forming apparatus C, and three incidents are generated at the image forming apparatus F. As can be seen from the status information, the individual incident is completely resolved to make the image forming apparatus operational.

FIG. 11 is a table showing the response time and the resolution time calculated for the incidents based on FIG. 9. 'NO' in FIG. 11 corresponds to 'NO' in FIG. 9. IRspT is the response time of the incident, and IRslT is the resolution time of the incident, which are represented by converting the unit time of 3 minutes to 0.05. Thus, one hour is represented as 1.00.

$\text{OPT}[P_{PR}, T_{PR}, j, i]$ is the time taken to resolve the i-th incident of the incidents occurred in the time period $T_{PR}$ at the image forming apparatus j of the device group $P_{PR}$. j can be one of the image forming apparatuses A through F. For example, $\text{OPT}[0,1,0,0]$ denotes the time taken to resolve the 0-th incident of incidents occurring in the time period $T_{PR} = 0$ at the image forming apparatus A of the device group having the code $P_{PR}$=0. The 0-th incident indicates the first incident when the order of the incidents is set to 0, 1 . . . .

OPT[$P_{PR}$,$T_{PR}$,j] is calculated based on Equation 5 and FIG. 11 as below:

OPT[0, 0, 0]=0, OPT[0, 2, 0]=0, OPT[0, 3, 0]=0, OPT[1, 0, 0]=0,
OPT[1, 1, 0]=0, OPT[1, 2, 0]=0, OPT[1, 1, 0]=0, OPT[1, 2, 0]=0,
OPT[1, 0, 1]=0, OPT[1, 2, 1]=0, OPT[2, 0, 0]=0, OPT[2, 1, 0]=0,
OPT[2, 2, 0]=0, OPT[2, 3, 0]=0, OPT[2, 0, 1]=0, OPT[2, 1, 1]=0,
OPT[2, 2, 1]=0, OPT[2, 3, 1]=0, OPT[2, 0, 2]=0, OPT[2, 1, 2]=0,
OPT[0, 1, 0]=OPT[0, 1, 0, 0]=0.15, OPT[1, 3, 0]=OPT[1, 3, 0, 0]=0.40,
OPT[1, 1, 1]=OPT[1, 1, 1, 0]=0.90, OPT[1, 3, 1]=OPT[1, 3, 1, 0]=0.20,
OPT[2,2,2]=OPT[2, 2, 2, 0]+OPT[2, 2, 2, 1]=0.70+0.30=1.00
OPT[2, 3, 2]=OPT[2, 3, 2, 0]=0.20.

$$OPT_{total} = \sum_{P_{PR}=0}^{N_{P_{PR}}-1} \sum_{j=0}^{N[P_{PR}]-1} \sum_{T_{PR}=0}^{N_{T_{PR}}-1} OPT[P_{PR}, T_{PR}, j, i]$$ [Equation 6]

$$= \sum_{P_{PR}=0}^{N_{P_{PR}}-1} \sum_{j=0}^{N[P_{PR}]-1} \sum_{T_{PR}=0}^{N_{T_{PR}}-1} \sum_{i=0}^{I[P_{PR},T_{PR},j]-1} OPT[P_{PR}, T_{PR}, j, i]$$

Using the result of Equation 6, the SCS calculator 43 calculates the average processing time per one incident based on Equation 7.

$$OPT_{average} = \frac{OPT_{total}}{I_{total}}$$ [Equation 7]

$$= \frac{\sum_{P_{PR}=0}^{N_{P_{PR}}-1} \sum_{j=0}^{N[P_{PR}]-1} \sum_{T_{PR}=0}^{N_{T_{PR}}-1} \sum_{i=0}^{I[P_{PR},T_{PR},j]-1} OPT[P_{PR}, T_{PR}, j, i]}{\sum_{P_{PR}=0}^{N_{P_{PR}}-1} \sum_{j=0}^{N[P_{PR}]-1} \sum_{T_{PR}=0}^{N_{T_{PR}}-1} I[P_{PR}, T_{PR}, j]}$$

In Equation 7, $OPT_{average}$ is the average processing time taken per one incident, and $OPT_{total}$ is the total processing time of the incidents at the image forming apparatuses 100-1 through 100-n.

When $OPT_{average}[P_{PR},T_{PR},j]$ is the average incident processing time taken to process the incidents at the image forming apparatus j belonging to the group of the code $P_{PR}$ during the time period of the code $T_{PR}$ based on Equation 7, the SCS calculator 43 calculates $OPT_{average}[P_{PR},T_{PR},j]$ based on Equation 8.

$$OPT_{average}[P_{PR}, T_{PR}, j] = \frac{OPT[P_{PR}, T_{PR}, j]}{I[P_{PR}, T_{PR}, j]}$$ [Equation 8]

$$= \frac{\sum_{i=0}^{I[P_{PR},T_{PR},j]-1} OPT[P_{PR}, T_{PR}, j, i]}{I[P_{PR}, T_{PR}, j]}$$

Equation 5 is re-expressed as Equation 9 based on Equation 8.

$$OPT[P_{PR},T_{PR},j]OPT_{average}[P_{PR},T_{PR},j] \times I[P_{PR},T_{PR},j]$$ [Equation 9]

OPT[$P_{PR}$,$T_{PR}$,j] in Equation 9 is derived from Equation 8. Using OPT[$P_{PR}$,$T_{PR}$,j] obtained based on Equation 9, the SCS calculator 43 calculates the percentage of OPT[$P_{PR}$,$T_{PR}$,j] based on Equation 10.

$$OPT_{\%}[P_{PR}, T_{PR}, j] = \frac{OPT[P_{PR}, T_{PR}, j]}{T[T_{PR}]} \times 100$$ [Equation 10]

In Equation 10, $OPT_{\%}[P_{PR},T_{PR},j]$ is the percentage of OPT [$P_{PR}$,$T_{PR}$,j] and used to calculate the SCS of the image forming apparatus. The SCS calculator 43 calculates the actual SCS according to Equation 11, using $OPT_{\%}[P_{PR},T_{PR},j]$.

$$SCS[P_{PR},T_{PR},j]=100-OPT_{\%}[P_{PR},T_{PR},j]$$ [Equation 11]

Equation 11 provides the SCS of the individual image forming apparatus 100-1, . . . , or 100-n. SCS[$P_{PR}$,$T_{PR}$,j] indicates the SCS of the specific image forming apparatus j during the time period corresponding to $T_{PR}$.

Equation 12 provides the SCS of the device group of the code $P_{PR}$ during the time period of the code $T_{PR}$.

$$SCS[P_{PR}, T_{PR}] = \frac{\sum_{j=0}^{N[P_{PR}]-1} SCS[P_{PR}, T_{PR}, j]}{N[P_{PR}]}$$ [Equation 12]

In Equation 12, SCS[$P_{PR}$,$T_{PR}$] denotes the SCS of a specific device group $P_{PR}$ during a specific time period $T_{PR}$.

Equation 13 provides the SCS SCS[$P_{PR}$] for the device group of the code $P_{PR}$.

$$SCS[P_{PR}] = \sum_{T_{PR}=0}^{N_{P_{PR}}-1} (T_{\%}[T_{PR}] \times SCS[P_{PR}, T_{PR}])$$ [Equation 13]

The SCS calculator 43 calculates the SCS of the image forming apparatuses 100-1 through 100-n in total using Equation 9, Equation 10, and Equation 11.

$$SCS_{TO} = \frac{\sum_{P_{PR}=0}^{N_{P_{PR}}-1} (N[P_{PR}] \times SCS[P_{PR}])}{\sum_{P_{PR}=0}^{N_{P_{PR}}-1} N[P_{PR}]}$$ [Equation 14]

-continued $$= \frac{\sum_{P_{PR}=0}^{N_{P_{PR}}-1}\left(N[P_{PR}]\times\left(\sum_{T_{PR}=0}^{N_{P_{PR}}-1}T_{\%}[T_{PR}]\times SCS[P_{PR},T_{PR}]\right)\right)}{\sum_{P_{PR}=0}^{N_{P_{PR}}-1}N[P_{PR}]}$$

Consequently, the SCS calculator 43 can acquire the SCSs $SCS_{TO}$, $SCS[P_{PR},T_{PR},j]$, $SCS[P_{PR},T_{PR}]$, and $SCS[P_{PR}]$ according to the specific criteria using Equation 11 through Equation 14. The SCSs of the various criteria are calculated because the administrator using the account solution may wish to consider not only the entire SCS but also the SCS of an important time period and the SCS of an important image forming apparatus.

The calculation of the SCS based on the specific criteria is explained by referring to FIGS. 8 through 12. FIG. 8 is a device priority table set for image forming apparatuses, FIG. 9 is a list of incidents occurred at the image forming apparatuses of FIG. 8 for 1 month, and FIG. 10 is a detailed table of the status information of FIG. 9.

In FIG. 8, there are six image forming apparatuses 100-1 through 100-n in total. The image forming apparatus of the group 'Low' is A, the image forming apparatuses of the group 'Normal' are B and C, and the image forming apparatuses of the group 'High' are D, E, and F. The administrator pre-sets the device priority with respect to the image forming apparatuses A~F.

Using the percentage of the times allocated to $T[T_{PR}]$ calculated based on Equation 10 and FIG. 6, $OPT_{\%}[P_{PR},T_{PR},j]$ is calculated as below:
$OPT_{\%}[0, 0, 0]=0$, $OPT_{\%}[0, 2, 0]=0$, $OPT_{\%}[0, 3, 0]=0$, $OPT_{\%}[1, 0, 0]=0$,
$OPT_{\%}[1, 1, 0]=0$, $OPT_{\%}[1, 2, 0]=0$, $OPT_{\%}[1, 1, 0]=0$, $OPT_{\%}[1, 2, 0]=0$,
$OPT_{\%}[1, 0, 1]=0$, $OPT_{\%}[1, 2, 1]=0$, $OPT_{\%}[2, 0, 0]=0$, $OPT_{\%}[2, 1, 0]=0$,
$OPT_{\%}[2, 2, 0]=0$, $OPT_{\%}[2, 3, 0]=0$, $OPT_{\%}[2, 0, 1]=0$, $OPT_{\%}[2, 1, 1]=0$,
$OPT_{\%}[2, 2, 1]=0$, $OPT_{\%}[2, 3, 1]=0$, $OPT_{\%}[2, 0, 2]=0$, $OPT_{\%}[2, 1, 2]=0$, $$OPT_{\%}[0, 1, 0] = \frac{OPT[0, 1, 0]}{T[1]} \times 100 = \frac{0.15}{66} \times 100 = 0.227\%$$

$$OPT_{\%}[1, 3, 0] = \frac{OPT[1, 3, 0]}{T[3]} \times 100 = \frac{0.40}{77} \times 100 = 0.519\%$$

$$OPT_{\%}[1, 1, 1] = \frac{OPT[1, 1, 1]}{T[1]} \times 100 - \frac{0.90}{66} \times 100 = 1.364\%$$

$$OPT_{\%}[1, 3, 1] = \frac{OPT[1, 3, 1]}{T[3]} \times 100 = \frac{0.20}{77} \times 100 = 0.260\%$$

$$OPT_{\%}[2, 2, 2] = \frac{OPT[2, 2, 2]}{T[2]} \times 100 = \frac{1.00}{99} \times 100 = 1.010\%$$

$$OPT_{\%}[2, 3, 2] = \frac{OPT[2, 3, 2]}{T[3]} \times 100 = \frac{0.20}{7} \times 100 = 0.260\%.$$

As above, when $OPT_{\%}[P_{PR},T_{PR},j]$ is obtained, the SCS calculator 43 calculates $SCS[P_{PR},T_{PR},j]$ using Equation 11. $SCS[0, 0, 0]=100$, $SCS[0, 2, 0]=100$, $SCS[0, 3, 0]=100$, $SCS[1, 0, 0]=100$, $SCS[1, 1, 0]=100$, $SCS[1, 2, 0]=100$, $SCS[1, 1, 0]=100$, $SCS[1, 2, 0]=100$, $SCS[1, 0, 1]=100$, $SCS[1, 2, 1]=100$, $SCS[2, 0, 0]=100$, $SCS[2, 1, 0]=100$, $SCS[2, 2, 0]=100$, $SCS[2, 3, 0]=100$, $SCS[2, 0, 1]=100$, $SCS[2, 1, 1]=100$, $SCS[2, 2, 1]=100$, $SCS[2, 3, 1]=100$, $SCS[2, 0, 2]=100$, $SCS[2, 1, 2]=100$, $SCS[0, 1, 0]=100-0.227=99.773$, $SCS[1, 3, 0]=100-0.519=99.481$, $SCS[1, 1, 1]=100-1.364=98.636$, $SCS[1, 3, 1]=100-0.260=99.740$, $SCS[2, 2, 2]=100-1.010=98.990$, $SCS[2, 3, 2]=100-0.260=99.740$ Using $SCS[P_{PR},T_{PR},j]$ obtained according to Equation 11, the SCS calculator 43 calculates $SCS[P_{PR},T_{PR}]$, $SCS[P_{PR}]$, and SCS using Equations 12, 13, and 14. The calculation results are shown in FIG. 12. In SCS[2,3] of FIG. 12, the numeral 2 indicates the priority group 'High' and the numeral 3 indicates the time period 'Critical'. Accordingly, 99.913 is the SCS of $SCS[P_{PR},T_{PR}]$ SCS[2,3], 99.924 is the SCS of $SCS[P_{PR}]$ SCS[2], and 99.910 is the total SCS SCS.

As mentioned above, the SCS calculator 43 calculates the various SCSs $SCS[P_{PR},T_{PR}]$, $SCS[P_{PR}]$, and SCS according to the search criteria. The SCS calculator 43 may calculate the SCS by taking into account the weights $PW[P_{PR}]$ and $TW[P_{PR}]$ set based on the respective priorities as shown in FIGS. 3, 4 and 5. The device weight $PW[P_{PR}]$ and the time weight $TW[P_{PR}]$ are considered because of the following reason.

The calculated SCSs $SCS[P_{PR},T_{PR}]$, $SCS[P_{PR}]$, and SCS may not reflect the user's sensitivity. Even when the same error occurs at the image forming apparatus (e.g., D in FIG. 8) of the high device priority and the image forming apparatus (e.g., A in FIG. 8) of the low device priority, the SCS of the two image forming apparatuses (e.g., A and D) may be different. This implies that the image forming apparatus D of the high device priority has the high use frequency, and the customers are more sensitive to the service continuity of the image forming apparatus D, or, alternatively, that the image forming apparatus is used infrequently, but for high priority tasks. Therefore, it may be necessary to calculate the SCS based on the user's sensitivity.

The calculation of the SCS based on the weights $PW[P_{PR}]$ and $TW[P_{PR}]$ is described. The SCS calculator 43 calculates the SCS of the image forming apparatus with the device weight $PW[P_{PR}]$ set based on the device priority as shown in FIG. 3, based on Equation 15.

$$SCS_P = \sum_{P_{PR}=0}^{N_{P_{PR}}-1} SCS[P_{PR}] \times PW[P_{PR}]$$ [Equation 15]

In Equation 15, $PW[P_{PR}]$ denotes the device weight set based on the device priority. $SCS_P$ denotes the SCS based on $PW[P_{PR}]$. Based on Equation 15 and $SCS[P_{PR}]$ of FIG. 12, $SCS_P$ is calculated as below:

$$SCS_P = \sum_{P_{PR}=0}^{3-1} SCS[P_{PR}] \times PW[P_{PR}] = SCS[0] \times PW[0] +$$
$$SCS[1] \times PW[1] + SCS[2] \times PW[2]$$
$$= 99.972 \times 0.2 + 99.858 \times 0.3 + 99.924 \times 0.5 = 99.914.$$

The SCS calculator 43 can calculate the SCS of the image forming apparatus with the time weight $TW[P_{PR}]$ based on the time priority as shown in FIG. 5, based on Equation 16.

$$SCS_T = \sum_{T_{PR}=0}^{N_{T_{PR}}-1} SCS[T_{PR}] \times TW[T_{PR}]$$ [Equation 16]

$$= \sum_{T_{PR}=0}^{N_{T_{PR}}-1} \left( \sum_{P_{PR}=0}^{N_{P_{PR}}-1} SCS[P_{PR}, T_{PR}] \times PW[P_{PR}] \right) \times TW[T_{PR}]$$

In Equation 16, $TW[P_{PR}]$ denotes the weight set based on the time priority, and $SCS_T$ denotes the SCS based on $TW[P_{PR}]$. The acquired $SCS_T$ based on Equation 16 and SCS $[P_{PR}]$ of FIG. 12 is shown in FIG. 13. As one can see from FIG. 13, $SCS_T$ based on the weight $TW[P_{PR}]$ set based on the time priority differs from SCS not considering the weight $TW[P_{PR}]$.

The SCS calculator 43 may calculate not only the SCS but also the number of incidents $I_{total}$. Among the occurred incidents, Resolved Incident (RI) indicates the number of the resolved incidents and Unresolved Incident (UI) indicates the number of unresolved incidents. In FIG. 9, RI=7 and UI=0. With respect to FIGS. 8 and 9, $I_{total}$ can be acquired based on Equation 4 as shown in FIG. 14. FIG. 14 is a table showing the number of incidents based on the device priority and the time priority.

In FIG. 14, $I[P_{PR}]$ denotes the number of incidents occurring in a specific device group, $I[T_{PR}]$ denotes the number of incidents occurring in a specific time period, and $I[P_{PR},T_{PR}]$ denotes the number of incidents occurring in the specific device group of the specific time period.

For example, as for I[0,1], since an incident occurs at the image forming apparatus A in the time period of 18 hours, the device priority $P_{PR}$ is '0' and the time period $T_{PR}$ is '1'. In other words, since no incident occurs outside the 18-hour time period, the image forming apparatus A has the value '0' except for I[0,1]. Note that $I[P_{PR}]=I[T_{TR}]=I_{total}=7$.

The determination of the service level of the solution when the acquired SCSs and the number of the incidents are reported to the administrator is explained. As indicated above, the report manager 44 generates the various SCSs and the numbers of the various incidents calculated in a requested time period, as a form to be represented to the administrator, for example, as graphs showing daily, monthly, and annual changes.

The report manager 44 objectively determines the service level of the solution by comparing with the preset thresholds and generates a report of the determination result. For this purpose, a Minimum Service Level (MSL) and an Expected Service Level (ESL) are preset with respect to the SCSs $SCS[P_{PR},T_{PR}]$, $SCS[P_{PR}]$, SCS, $SCS_P$, and $SCS_T$, and the number of incidents (e.g., $I[P_{PR},T_{PR}]$). The MSL may be the criterion to distinguish 'Penalty' and 'Satisfied', and the ESL may be the criterion to distinguish 'Satisfied' and 'Reward'. The threshold set for the SCS may be the first threshold, and the threshold set for the number of incidents may be the second threshold.

'Penalty' indicates that the solution service level is below the agreement and thus applies restraint on the provider of the image forming apparatuses 100-1 through 100-n or the solution provider. For example, the provider of the image forming apparatuses 100-1 through 100-n or the solution provider can supply new image forming apparatuses to the enterprise using the image forming apparatuses 100-1 through 100-n or impose a compensation. When the solution service level goes beyond the agreement, the enterprise using the image forming apparatuses 100-1 through 100-n gives a reward to the provider.

If the calculated SCS is less than the MSL (which is one of the first thresholds), the report manager 44 determines 'Penalty'. If the calculated SCS is greater than the ESL, the report manager 44 determines 'Reward'. If the calculated SCS lies between the MSL and the ESL, the report manager 44 determines 'Satisfied'.

If the calculated number of incidents is greater than $MSL_1$ (which is one of the second thresholds), the report manager 44 determines 'Penalty'. If the calculated number of incidents is less than $ESL_1$, the report manager 44 determines 'Reward'. If the calculated number of incidents lies between $MSL_1$ and $ESL_1$, the report manager 44 determines 'Satisfied'.

FIG. 15 is a table showing satisfactions of $SCS[P_{PR},T_{PR}]$ calculated based on Equation 12 and the number of the incidents $I[P_{PR},T_{PR}]$ of FIG. 14. FIG. 16 is a table showing the satisfaction of the SCS calculated based on the device weight $PW[P_{PR}]$ and the time weight $TW[P_{PR}]$.

In FIGS. 15, and 16, the minimum threshold and the maximum threshold set for the number of incidents $I[P_{PR},T_{PR}]$ are $MSL_1$ and $ESL_1$ respectively. The minimum threshold and the maximum threshold set for the SCS $SCS[P_{PR},T_{PR}]$ are MSL and ESL respectively. The minimum threshold and the maximum threshold set for the SCS $SCS_P$ are $MSL_P$ and $ESL_P$ respectively. The minimum threshold and the maximum threshold set for the SCS $SCS_T$ are $MSL_T$ and $ESL_T$ respectively.

The report manager 44 determines the satisfaction of the SCS by comparing the number of incidents and the SCS calculated based on the device priority and the time priority with the maximum threshold and the minimum threshold as shown in FIGS. 15 and 16. For example, as for $I[P_{PR},T_{PR}]=I[2,3]$, the service satisfaction is 'Satisfied'. As for I[2,1], the service satisfaction is 'Penalty'.

Figure 17:
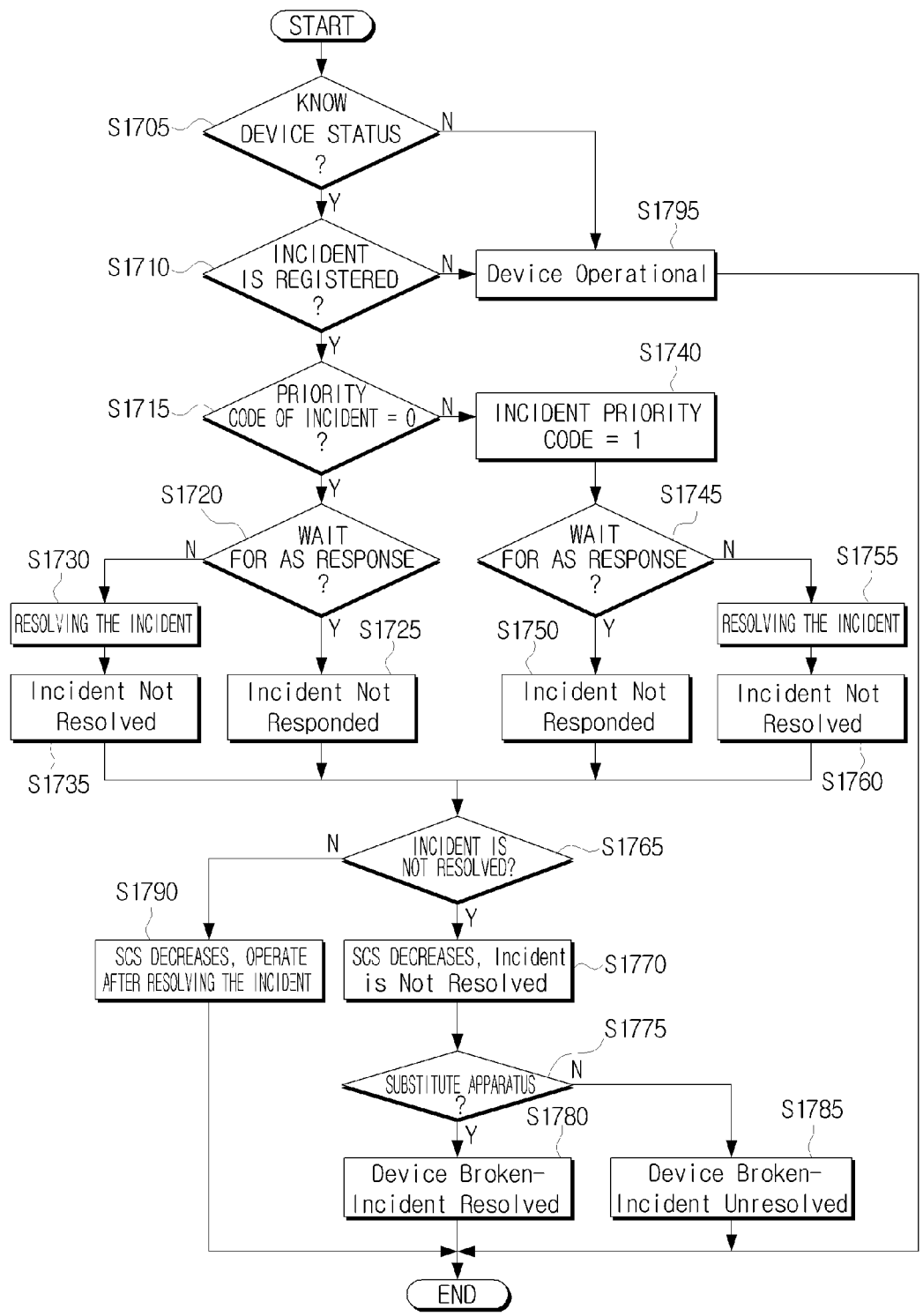
FIG. 17 is a flowchart of operations of an incident manager according to the condition change until the error of the image forming apparatus is completed handled.

An image forming apparatus management process will be described with reference to FIGS. 17 and 18. FIG. 17 is a flowchart of operations of the incident manager according to the status change until the error of the image forming apparatus is handled. In FIG. 17, 'DEVICE' indicates the image forming apparatus 100-1, . . . , or 100-n, and the other text shown in FIG. 17 will be understood from the detailed descriptions of FIG. 10.

When the incident manager 30 knows the status of the image forming apparatus 100-1 in operation S1705, the incident manager 30 determines whether the administrator registers the incident occurred at the image forming apparatus 100-1 to the incident manager 30, in operation S1710. For example, in operation S1710, when the incident is a claim, the claim is registered and managed by the claim handler 31. The administrator inputs the priority code of the claim on the solution web pages using the table of FIG. 3. If the priority code of the incident is '0' in operation S1715, the incident manager 30 determines the status 'Degradation', that is, determines that the image forming apparatus 100-1 is operational but under performance degradation.

The incident manager 30 determines whether the image forming apparatus 100-1 is waiting for a response from the repairman in operation S1720. The response time from the repairman can be confirmed when the administrator inputs the response on the solution web pages relating to the management server 300. If the image forming apparatus 100-1 is expecting a response from the repairman, the incident manager 30 determines that the incident is not responded yet ('Incident Not Responded') in operation S1725. If the image forming apparatus 100-1 does not expect the response of the repairman, the incident manager 30 determines that the incident is being responded to and the repairman is resolving the incident ('Incident Not Resolved') in operations S1730 and S1735.

If the priority code of the incident is '1' in operation S1740, the incident manager 30 determines whether the image forming apparatus 100-1 is waiting for a response from the repairman in operation S1745. If the image forming apparatus 100-1 is expecting a response from the repairman, the incident manager 30 determines that the incident has not yet been responded to ('Incident Not Responded') in operation S1750.

If the image forming apparatus 100-1 does not expect the response of the repairman, the incident manager 30 determines that the incident has been responded to and that the repairman is resolving the incident ('Incident Not Resolved') in operation S1755 and S1760. When the incident manager 30 determines the status 'Performance Degraded' of the image forming apparatus 100-1 in operations S1725 and S1735, the status 'Device Not Operational' is determined in S1750 and S1760.

If the incident registered in operation S1710 is not yet resolved in operation S1765, then in operation S1770 the image forming apparatus 100-1 is in the status 'Incident Not Resolved', which lowers the SCS. If the apparatus is substituted to address the incident in operation S1775, the incident is resolved and the image forming apparatus 100-1 becomes operational. The administrator registers the response time and the incident resolution time of the repairman on the web pages of the management server 300. The data relating to the incident, such as the priority of the incident, the incident occurrence time, the response time, and the incident resolution time, is stored in the second DB 60 by the incident manager 30. If the incident is resolved in operation S1765, the image forming apparatus 100-1 becomes operational without the substitution but the SCS decreases in operation S1790.

If the incident manager 30 does not know the status of the image forming apparatus 100-1 in operation S1705 and if the incident is not registered in operation S1710, the incident manager 30 determines that the image forming apparatus 100-1 is operational ('Device Operational') in operation S1795.

Figure 18:
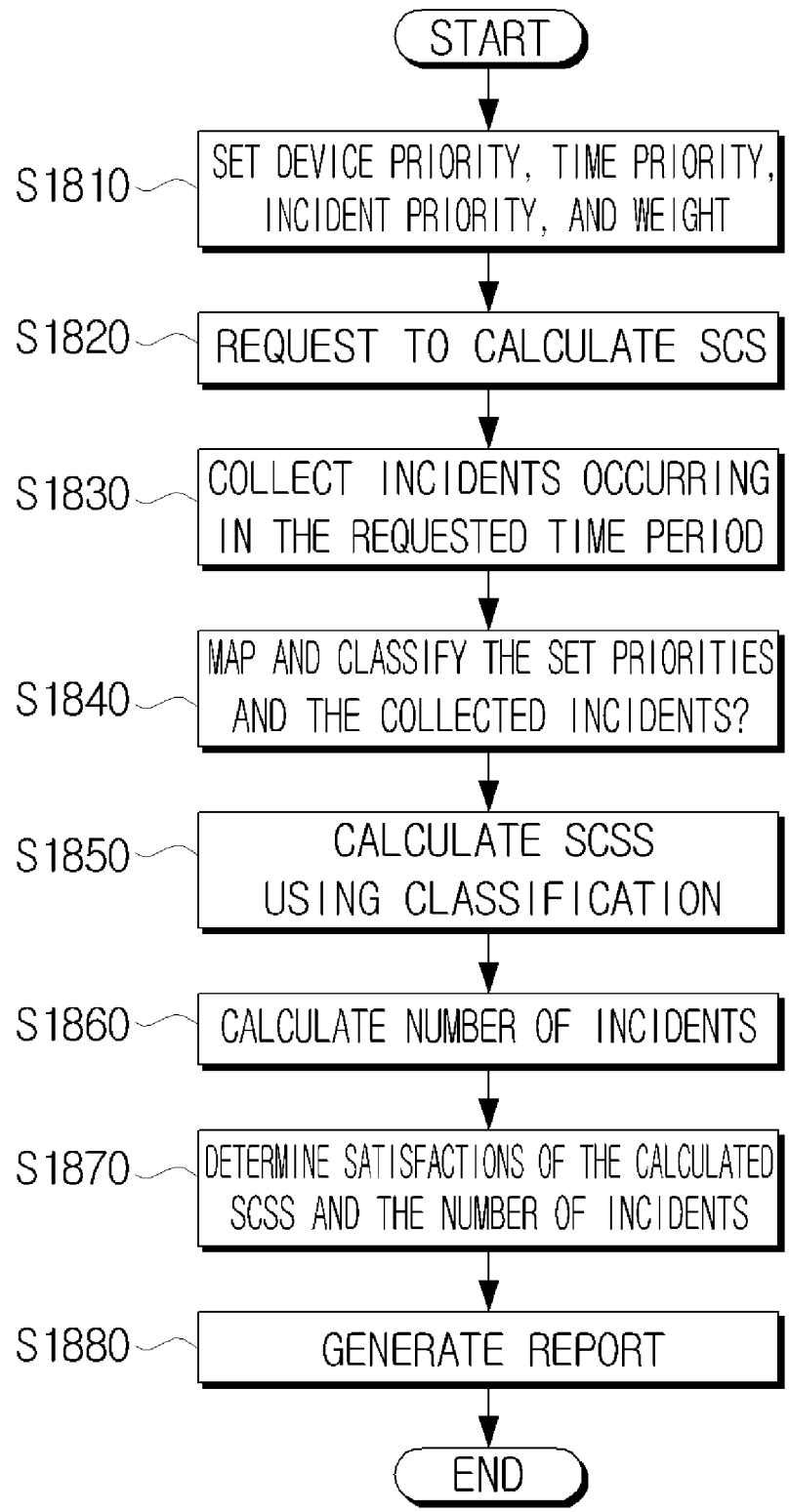
FIG. 18 is a flowchart of the SCS calculating method of the management server.

FIG. 18 is a flowchart of the SCS calculating process of the management server. Referring to FIGS. 1 through 18, the administrator sets the criteria data required for the SP 200 to calculate the SCS of the image forming apparatuses 100-1 through 100-n by accessing the management server 300 in operation S1810. The set criteria data is stored to the first DB 50. The criteria data comprises the device priority of the image forming apparatuses 100-1 through 100-n, the weight $PW[P_{PR}]$ on the device priority, the time period distribution, the time priority based on the distributed time periods, the weight $TW[P_{PR}]$ on the time priority, the type of the incident, and the priority of the incident. The administrator defines the criteria data based on the priority criteria pre-set at the management server 300, for example, based on 'High', 'Normal', and 'Low' as shown in FIGS. 3, 4, and 5.

When the administrator requests to calculate the SCS in operation S1820, the data collector 41 collects incidents occurring at the image forming apparatuses 100-1 through 100-n during a requested time period from the second DB 60, and collects the defined criteria data from the first DB 50 in operation S1830.

The data classifier 42 maps and classifies the collected criteria data and incidents in operation S1840. For example, the data classifier 42 examines the grade of the incident from the criteria data and maps the time priority and the weight $TW[P_{PR}]$ set for the occurrence time of the incident, the device priority and the weight $PW[P_{PR}]$ set for the corresponding image forming apparatus (e.g., 100-1), to the incident.

In operation S1850, the SCS calculator 43 calculates the SCS by specific criteria using the classification. The SCS calculator 43 calculates various SCSs based on Equation 1 through Equation 16. The SCS calculator 43 calculates the number of incidents by specific criteria using the classification in operation S1860. For example, in operation S1860, the SCS calculator 43 calculates the number of incidents $I[P_{PR}]$ at a specific device group, the number of incidents $I[T_{PR}]$ in a specific time period, and the number of incidents at a specific device group in a specific time period $I[P_{PR},T_{PR}]$; however, the SCS calculator 43 is not limited to these numbers. Next, the report manager 44 determines the satisfactions of the various SCSs and the numbers of the incidents in operation S1870, and generates a report to be provided to the administrator using the determination results in operation S1880.

As indicated above, since the enterprise printing account solution calculates the SCS of the printer, the system reliability can be enhanced and more stable services can be provided with minimal error between the user satisfaction and the actual calculations of the system. Particularly, by considering that the priority of the image forming apparatus varies according to the use environment and that the error occurring at the image forming apparatus varies according to the business hour, the more objective service level of the solution, that is, the more objective SCS can be calculated and the system performance can be enhanced.

As set forth above, in the image forming apparatus management server, the SCS calculating process of the management server, and the image forming apparatus management system, the cause of the various incidents at the image forming apparatus can be analyzed and predicted. Aspects of the present invention calculate the SCS by applying a different priority and/or a different weight to an error occurring at a specific image forming apparatus in a specific time period. Therefore, the defect of the image forming apparatus can be determined, the cause according to the transaction between the management server and the image forming apparatus can be determined, and the cause of the error can be accurately determined through the analysis based on the device priority of the image forming apparatus.

Any administrator of the service provider or any authorized user, such as the administrator of the management server, can request the SCS in real time, and the management server can calculate the SCS and generate a report in real time. Since the SCS calculation result is represented as a graph showing the daily, monthly, and annual change, the administrator can utilize the graph by detecting the transition of the error occurring in a specific time period or in a specific image forming apparatus and taking action to prevent the error.

The error of the specific image forming apparatus can be determined by applying the device priority to the image forming apparatus. By analyzing the number of incidents of a specific model or a specific image forming apparatus, the incident resolution time, and the number of the same incidents, an accurate time for replacing the consumable product can be informed to the administrator or the user to thus prevent an unexpected error due to a lack of the consumable product.

The time and the image forming apparatus having frequent incidents can be acquired by analyzing the type of the incident and the number of the incidents in a specific time period or in a specific image forming apparatus. Therefore, when the measured value of the image forming apparatus frequently used in the acquired time period exceeds the threshold, the frequency of errors can be minimized by controlling to use the image forming apparatus less often in the acquired time period.

An accurate charging system can be implemented by measuring the service level of the solution. The satisfaction of the service level is calculated by comparing the calculated SCS or the number of incidents with the preset thresholds, and the reward or the penalty is determined according to the satisfaction. Hence, the charging system between the provider and the user of the image forming apparatus can be accurately implemented. Consequently, aspects of the present invention can be useful in the global Business to Business (B2B) relating to image forming apparatuses.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CDs, DVDs, Blu-ray discs, magnetic tapes, floppy disks, and optical data storage devices. Aspects of the present invention may also be embodied as carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus management server comprising:
a setup manager to set priority with respect to items required to calculate a Service Continuity Score (SCS) indicative of a normal operation time of an image forming apparatus;
an incident manager to register and manage an incident related to the image forming apparatus; and
an SCS manager to calculate the SCS using the registered incident and the priority set for the items.

2. The image forming apparatus management server of claim 1, wherein the setup manager sets a device priority of image forming apparatuses, and a time priority of time periods.

3. The image forming apparatus management server of claim 2, wherein the SCS manager comprises:
a data collector to collect incidents occurring in a requested time period;
a data classifier to determine the time priority set for the time period having the collected incidents and the device priority set for the image forming apparatus having the collected incidents, and to conduct mapping according to each of the collected incidents; and
an SCS calculator to calculate the SCS according to a given criteria, using the time priority and the device priority that are mapped based on each of the collected incidents.

4. The image forming apparatus management server of claim 3, wherein the SCS calculator calculates an SCS of the image forming apparatus, an SCS of a group comprising image forming apparatuses given the same device priority in a requested time period, an SCS of an image forming apparatus group given the same device priority, and an SCS of the image forming apparatuses.

5. The image forming apparatus management server of claim 3, wherein the SCS manager further comprises:
a report manger to generate a report of the calculated SCSs;
wherein the SCS calculator calculates a number of the collected incidents according to a given criterion; and
wherein the report manager determines a satisfaction of the SCS by comparing the calculated SCS with preset first thresholds and comparing the number of the calculated incidents with preset second thresholds, and generates the report of the determination results.

6. The image forming apparatus management server of claim 5, wherein the SCS calculator calculates a number of incidents occurring at each of the image forming apparatuses, a number of incidents occurring at a group of image forming apparatuses given the same device priority during a requested time period, and a number of incidents occurring in a specific segment of a requested time period.

7. The image forming apparatus management server of claim 2, wherein:
the setup manager applies a weight to the device priority set for each of the image forming apparatuses and applies a time weight to each of the time priorities; and
the SCS manager calculates the SCS based on at least one of the weight applied to the device priority and the weights applied to the time priorities.

8. The image forming apparatus management server of claim 1, wherein the incident manager comprises:
a claim handler to manage a claim received from a user of the image forming apparatus for a time period so that the received claim is registered and resolved;
an inquiry handler to manage an inquiry related to the image forming apparatus and inquired by the user for a time period so that the inquiry is registered and resolved; and
an error notification handler to manage an error notification automatically received from the image forming apparatus for a time period so that the error notification is registered and resolved.

9. The image forming apparatus management server of claim 1, further comprising:
a first database (DB) which contains the priority set for the items at the setup manager; and
a second DB which maps and stores the incidents registered by the incident manager with the time of the incidents and the image forming apparatuses having the incidents.

10. A Service Continuity Score (SCS) calculating method of a management server, the method comprising:
setting a priority with respect to items required to calculate an SCS indicative of a normal operation time of an image forming apparatus;
registering and managing an incident related to the image forming apparatus; and
calculating the SCS using the registered incident and the priority set for the items.

11. The SCS calculating method of claim 10, wherein the setting of the priority comprises setting a device priority of image forming apparatuses and a time priority of time periods.

12. The SCS calculating method of claim 11, wherein the calculating of the SCS comprises:
collecting incidents occurring in a requested time period;
determining the time priority set for the time period having the collected incidents and the device priority set for the image forming apparatus having the collected incidents, and mapping according to each of the collected incidents; and calculating the SCS according to a given criterion, using the time priority and the device priority that are mapped based on each of the collected incidents.

13. The SCS calculating method of claim 12, wherein the calculating of the SCS based on the specific criteria comprises calculating an SCS of the image forming apparatus, an SCS of a group comprising image forming apparatuses given the same device priority in a requested time period, an SCS of an image forming apparatus group given the same device priority, and an SCS of the entire image forming apparatus.

14. The SCS calculating method of claim 12, further comprising:

calculating a number of the collected incidents according to the specific criteria; and generating a report of the calculated SCSs;

wherein the generating of the report comprises determining a satisfaction of the SCS by comparing the calculated SCS with preset first thresholds and comparing the number of the incidents with preset second thresholds, and generating the report of the determination results.

15. The SCS calculating method of claim 14, wherein the calculating of the number of incidents comprises calculating a number of incidents occurring at each of the individual image forming apparatuses, a number of incidents occurring at a group of image forming apparatuses given the same device priority during a requested time period, and a number of incidents occurring in a specific segment of a requested time period.

16. The SCS calculating method of claim 11, wherein:

the setting of the priority comprises applying a weight to the device priority set for each of the image forming apparatuses and applying a time weight to each of the time priorities; and the calculating of the SCS comprises calculating the SCS based on at least one of the weight applied to the device priority and the weights applied to the time priorities.

17. The SCS calculating method of claim 10, wherein the managing of the incident comprises:

managing a claim received from a user of the image forming apparatus for a time period so that the received claim is registered and resolved;

managing an inquiry related to the image forming apparatus and inquired by the user for a time period so that the inquiry is registered and resolved; and managing an error notification automatically received from the image forming apparatus for a time period so that the error notification is registered and resolved.

18. The SCS calculating method of claim 17, wherein the managing of the incident further comprises:

when the error notification is registered, notifying an administrator responsible to process the error notification of the registered error notification using an e-mail address of a service provider or a short message service.

19. An image forming apparatus management system comprising:

a management server to calculate a Service Continuity Score (SCS) indicative of a normal operation time of image forming apparatuses and to inform an administrator of the calculation result; and a service provider to receive an SCS calculation request from the administrator and requests the calculation result from the management server.

20. The image forming apparatus management system of claim 19, wherein the management server comprises:

a setup manager to set a device priority of each of the image forming apparatuses and a time priority of each of time periods required to calculate the SCS;

an incident manager to register and manage incidents relating to the image forming apparatuses; and an SCS manager to calculate the SCS using the registered incidents and the set priorities.

21. The image forming apparatus management system of claim 20, wherein the SCS manager comprises:

a data collector to collect incidents occurring in a requested time period;

a data classifier to determine the time priority set for the time period having the collected incidents and the device priority set for the image forming apparatus having the collected incidents, and to map according to each of the collected incidents;

an SCS calculator to calculate the SCS according to a given criteria, using the time priority and the device priority that are mapped based on each of the collected incidents; and a report manager to generate a report of the calculated SCS.

22. A management server to manage a plurality of image forming apparatuses, the management server comprising:

an incident manager to receive an error notification from one of the image forming apparatuses and to generate an incident based on the error notification;

a setup manager to divide the plurality of image forming apparatuses into a plurality of device priority groups, to create a plurality of time periods and assign a priority to each of the time periods, and to assign a priority to the incident; and an SCS manager to collect incidents generated by the incident manager, to calculate a Service Continuity Score (SCS) indicative of a normal operation time of the image forming apparatuses based on the device priority, a priority of the time periods during which each of the collected incidents occurred, and a priority of each of the collected incidents, and to provide the SCS to the administrator.

23. The management system of claim 22, wherein the SCS manager calculates one or more of an SCS of one of the image forming apparatuses, an SCS of one of the device priority groups, an SCS of the one of the device priority groups during one of the plurality of time periods, or the SCS based on the collected incidents for all of the image forming apparatuses during all of the plurality of time periods.

24. The management system of claim 23, wherein the SCS manager calculates the SCS based on at least one of a number of incidents for a specific model of image forming apparatus, a specific image forming apparatus, an incident resolution time, and a number of similar incidents.

25. A non-transitory computer readable medium comprising instructions that, when executed by a computer, cause the computer to perform the method of claim 10.

* * * * *